Nov. 9, 1965 K. LARSSON 3,216,183
DEVICE FOR FILTERING AIR IN SPRAY-PAINTING BOOTHS
Filed Dec. 20, 1962
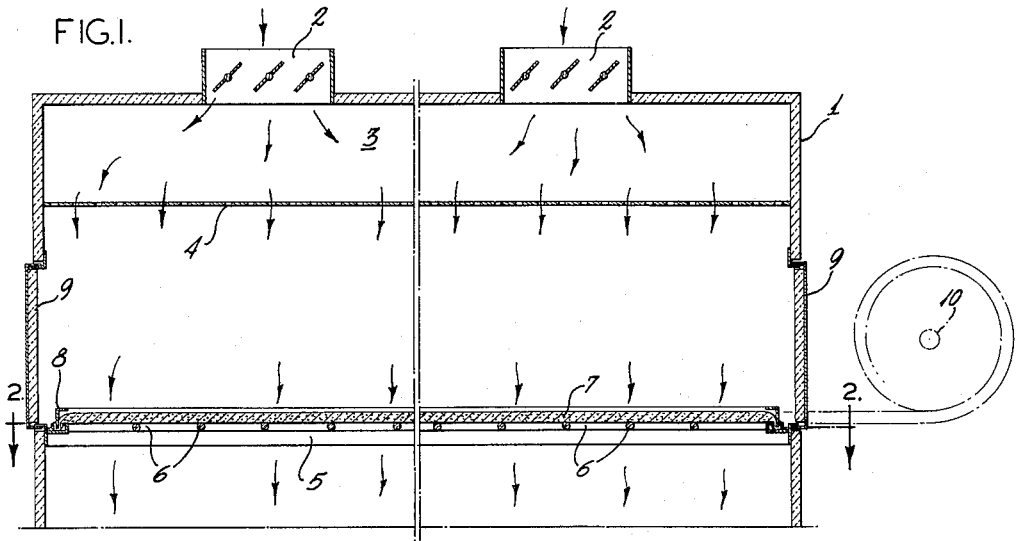
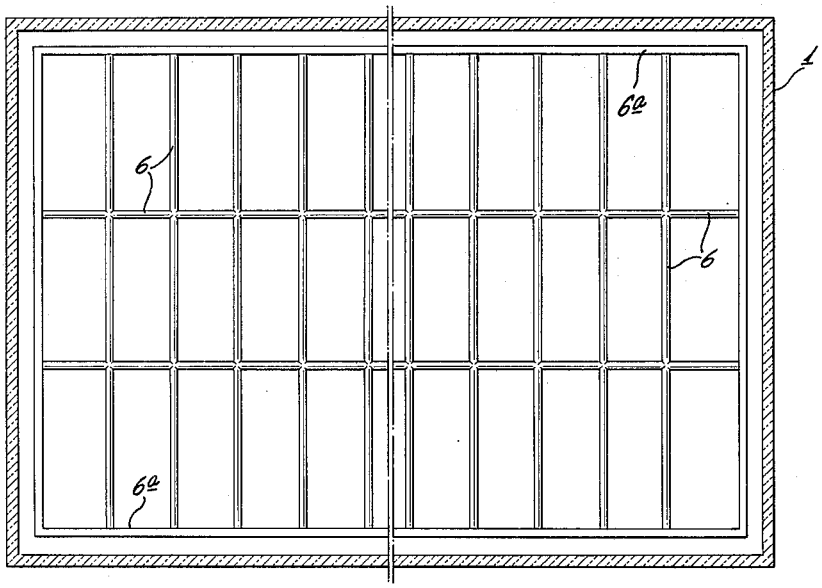
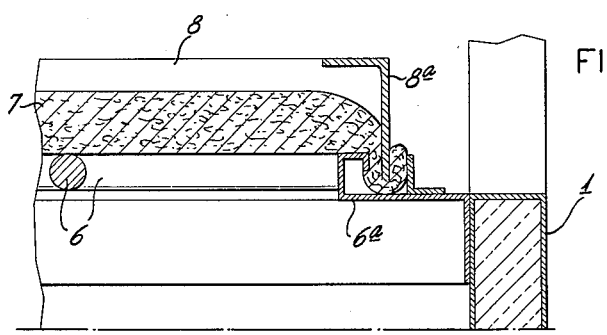
INVENTOR:
KRISTER LARSSON
BY Howson & Howson
ATTYS.

United States Patent Office 3,216,183
Patented Nov. 9, 1965

3,216,183
DEVICE FOR FILTERING AIR IN SPRAY-PAINTING BOOTHS
Krister Larsson, Jonkoping, Sweden, assignor to Aktiebolaget Svenska Fläktfabriken, Stockholm, Sweden
Filed Dec. 20, 1962, Ser. No. 246,160
Claims priority, application Sweden, Dec. 28, 1961, 13,046/61
1 Claim. (Cl. 55—478)

This invention relates to a novel and improved arrangement for filtering air in a booth wherein objects are conveyed through the booth in a continuous or intermittent manner for spray painting. Conventionally such booths comprise a channel equipped with means for supplying heated and filtered ventilating air which sweeps across the object being painted to carry off paint fumes and fine particles of paint. The channel terminates below the objects being painted in means for discharging the air.

In booths constructed in accordance with the foregoing, the ventilating air is usually supplied through the channel roof, the greater portion of which is underlaid by a plurality of filters arranged in the form of panels for cleaning the supplied air. These panel type filters are usually square shaped being approximately .5 of a meter in length and placed transverse to the direction of air flow. The panels are held in place by a checkered frame work mounted in the roof and are clamped to the frame to ensure satisfactory sealing between the panels and the frame.

Such an arrangement not only requires a complicated and expensive frame work, but involves high filter costs as well. It has, moreover, proved to have disadvantages in that the exchange of individual filters is troublesome and time consuming which entails the risk that large quantities of dust will be spread during the exchange operation.

With the foregoing in mind the invention has for its principal object the elimination of the aforesaid disadvantages in a simple and effective way.

In the present embodiment of the invention a filter means comprises a grating above which is disposed at least one coherent filter mat which extends transversely and longitudinally in the channel, the mat being held on the grating by liftable sealing frames which press the edges of the filter mat against the grating.

Because a coherent filter mat is utilized, the grating required for supporting the mat is of simple construction, inexpensive design and of minimum dimensions. Furthermore, the filters are easy to exchange, and there is a minimum risk of dust spreading when the sealing frames are lifted and the filter mat is removed.

To further simplify filter exchange, the channel is provided with openings placed in either its longitudinal side walls or at its opposite end walls for inserting a new filter mat therethrough or removing a used filter mat. In accordance with another feature of the invention the mats can be stored and collected respectively on roll-up means mounted outside the openings.

Other objects and a fuller understanding of the invention may be had by referring to the following description and claim taken in conjunction with the accompanying drawing in which:

FIG. 1 is a sectional view through the upper portion of a channel in which objects are spray-painted;

FIG. 2 is a section taken along the line 2—2 of FIG. 1; and

FIG. 3 is an enlarged fragmentary sectional view illustrating the means for holding the filter mat against the supporting grating.

Referring to the drawing 1 desinates the casing of a channel for spray-painting which is ventilated by air supplied through air inlet openings 2 at the top of the channel. To insure that the ventilating air is distributed across the entire cross-section of the channel, a quiescent chamber underlies the air inlet openings 2 and is defined by a drum 3 with a perforated bottom 4. In order to provide clean air to the objects being painted, air filter means 5 is interposed between the air inlet openings 2 and the objects being painted. The air filter means is arranged in the form of a ceiling and comprises a filter 7 overlying a grating 6 which is supported on the walls of the channels. The coherent filter mat 7 is disposed transverse to the air flow. The mat 7, which may be made of Viledon or a similar material is retained on the grating by liftable sealing means which cooperate with the mat and the grating to form a seal along the outer marginal portion of the mat. In the present instance the liftable sealing means comprise frames 8 which have a marginal depending portion disposed circumferentially thereof and which press the edges of the mat against the grating. As is illustrated in FIG. 3, the edges of the frames 8 have downwardly projecting flanges 8a which press the mat into a portion of the grating adapted to receive the flanges 8a and the mat. To this end the portion of the grating adjacent to the wall of the channel has a U-shaped flanged section 6a which allows the flanges 8a to seat the mats therein. Because of the aforementioned construction, the sealing frames may be lifted in their entirety either manually or automatically by suitable lifting mechanism (not shown).

To exchange the filter mat the sealing frames are first lifted; thereafter the mat is rolled up and removed through means defining openings 9 in the channel casing, the openings being equipped with closeable doors. Through the openings a new filter mat is then inserted, flattened, and clamped by the frame 8. Further filter exchange may be facilitated still more by storing and collecting the filter mats on roll-up means 10 provided outside the openings (see FIG. 1).

What I claim is:

In a booth for spray-painting objects being conveyed therethrough, said booth comprising a casing having air supply means including a ventilating air inlet to permit a flow of ventilating air to sweep across the objects being painted: air filter means interposed entirely between said air inlet and said objects being painted, said air filter means comprising a generally rectangular grating, and support means connecting and supporting said grating interiorly of said casing, said grating disposed substantially transverse to the direction of flow of said air and having a first upstanding marginal flange portion circumscribing said grating, means defining an opening in said casing adjacent to and registerable with said grating, and a door mounted on said casing covering said opening; at least one coherent filter mat extending from said opening across said grating; a liftable sealing frame having a marginal depending second flange portion disposed circumferentially of said sealing frame, said frame superimposed on said mat and said grating and said second flange dimensioned for cooperation with said first flange, at least one of said flanges being longitudinally bifurcated and the other of said flanges positioned to engage and clamp said mat between said bifurcation to form a seal along the outer marginal portion of said grating.

References Cited by the Examiner
UNITED STATES PATENTS

| | | | |
|---|---|---|---|
| 411,185 | 9/89 | Crosby et al. | 55—494 X |
| 1,898,807 | 2/33 | Barnes | 55—91 |
| 1,968,436 | 7/34 | Bishop | 55—487 |
| 2,097,953 | 11/37 | Ludwig. | |
| 2,404,479 | 7/46 | Essick | 55—491 X |
| 2,486,251 | 10/49 | Braun. | |
| 2,709,489 | 5/55 | Keebler. | |
| 2,730,033 | 1/56 | Mellor | 55—481 |
| 2,752,003 | 6/56 | Hersey et al. | 55—354 |
| 2,841,073 | 7/58 | Forshee | 55—354 |
| 2,869,680 | 1/59 | Fields | 55—500 |
| 2,875,680 | 3/59 | Forshee | 55—354 |
| 3,058,279 | 10/62 | Metcalfe | 55—495 |
| 3,063,222 | 11/62 | Hagendoorn | 55—354 |
| 3,076,303 | 2/63 | Durgeloh | 55—511 |
| 3,138,087 | 6/64 | Larsson et al. | |
| 3,142,550 | 7/64 | Kuehne | 55—495 |

ROBERT F. BURNETT, *Primary Examiner.*

HARRY B. THORNTON, *Examiner.*